UNITED STATES PATENT OFFICE 2,107,366

ORGANIC COMPOUNDS CONTAINING ETHER AND THIO ETHER LINKAGES

Herman A. Bruson, Philadelphia, Pa., assignor to Röhm & Haas Company, Philadelphia, Pa.

No Drawing. Application December 24, 1936, Serial No. 117,516

11 Claims. (Cl. 260—150)

This invention relates to new polyalkylene polyethers containing at least one thio ether link and having the general formula $$(R-A-(C_nH_{2n}-O)_x-C_nH_{2n})_2-S$$

in which A is sulfur or oxygen, R is a cyclic or substituted cyclic group preferably attached to the atom represented by A through a nuclear carbon atom, $x$ is one to two and $n$ is two or three. The cyclic group may be aromatic, alicyclic or heterocyclic and may contain substituents such as the alkyl, aralkyl, cycloalkyl, aryl, acyl, alkoxy, nitro, carboxy, and sulfonic groups as well as halogens.

These compounds have properties which render them valuable for use as insecticides, moth-proofing agents, etc. and as intermediates in the preparation of capillary active compounds.

According to the present invention the new polyalkylene polyethers containing at least one sulfur atom in the chain may be prepared by reacting an inorganic sulfide, preferably an alkali metal sulfide, with an ether halide of the general formula $R-A-(C_nH_{2n}-O)_x-C_nH_{2n}Y$ in which R, A, $n$ and $x$ have the foregoing meanings and Y is a halogen atom. Although all of the halides are operative, the invention will be illustrated by employing the chlorides.

These ether chlorides may be prepared by condensing a dihalogeno ether of the general formula $Y-(C_nH_{2n}-O)_x-C_nH_{2n}Y$ with an aromatic, alicyclic or heterocyclic compound which has either a hydroxyl or sulfhydryl group preferably attached to one of its nuclear carbon atoms. The condensation is carried out in the presence of an excess of the dihalogeno ether and sufficient alkali to unite with only one atom or chlorine. In the case of the phenols and mercaptans the reaction is carried out by dissolving them first in the equivalent amount of aqueous or alcoholic caustic solution and then reacting this solution with the dihalogeno ether. In the case of alicyclic or heterocyclic hydroxy compounds which do not react with alkali hydroxide it is necessary to convert them to the corresponding alcoholate by treatment with metallic sodium or potassium, or with sodium monoxide, before heating with the dihalogeno ether.

Dichloroethers which may be used in the present process are, for example, β,β'-dichlorodiethyl ether, β-chloroethoxy-β'-chloro-diethyl ether, or dichlor diisopropyl ether. Such dichloro polyalkylene ethers condense very readily with alcoholates, phenolates and mercaptides, as disclosed in part in copending applications Serial No. 79,718 filed May 14, 1936, and Serial No. 82,184 filed May 28, 1936, or as described above to give the starting materials for the present invention. The phenols which are useful in preparing these complex polyether chlorides are monohydroxy phenols such as phenol, all alkyl phenols including the cresols, xylenols, thymol, butyl, amyl, hexyl, octyl, lauryl and higher alkyl phenols, phenyl, benzyl and cyclohexyl phenols, guaiacol, nitro phenols, halogenated phenols, alkenyl phenols such as allyl and β-methyl-allyl phenols, hydroxy benzophenone and hydroxy acetophenone etc., salicyclic acid and phenol sulfonic acids as well as the corresponding derivatives of the naphthols and the thio phenols corresponding to the above listed phenols. The operative alcohols are those of the alicyclic series such, for example, as cyclohexanol and its ring substituted products which may be prepared by hydrogenating any of the foregoing phenols, benzyl alcohol, menthol, borneol, etc. The heterocyclic alcohols such as tetrafurfuryl alcohol, 2-hydroxy-benzothiazole and other 2-hydroxy-thiazoles and oxazoles may also be used as well as the corresponding mercapto compounds of both the alicyclic and heterocyclic alcohols.

It is thus obvious that the group represented by R in the above formulae may be varied over a wide range of organic radicals and that the atom represented by A may be either oxygen or sulfur irrespective of the nature of the group represented by R.

The complex monochloro polyethers prepared from these compounds and a dichloro polyalkylene ether all react readily with an inorganic sulfide, particularly the soluble alkali metal and alkaline earth metal sulfides to form new thio ethers according to the equation $$2R-A-(C_nH_{2n}-O)_x-C_nH_{2n}Cl + Na_2S =$$
$$(R-A-(C_nH_{2n}-O)_x-C_nH_{2n})_2S + 2NaCl$$

This reaction is preferably carried out in an aqueous or alcoholic solution by boiling the mixture of the reactants under a reflux condenser for about four to ten hours, depending on the rate at which any given mixture will react. The products are crystalline solids or high boiling, light-colored liquids. They may be used directly as insecticides, etc. and, when they contain sulfonic acid or other acidic salt forming groups, as wetting, dispersing and emulsifying agents. Those compounds made from the phenols may be sulfonated in either or both of the aromatic rings and the resulting acids or their soluble salts used as emulsifying, wetting, detergent or dispersing agents. The thio ether atoms may also be oxidized to form sulfoxides and sulfones and they may also be treated with alkylating agents to form sulfonium compounds.

The invention may be illustrated by the following examples but it is not limited to the exact details of operation, materials used, etc. as it may otherwise be practiced within the scope of the appended claims.

Example 1.—A mixture of 100 g. of β-phenoxy-β'-chloro-diethyl ether, 60 g. of sodium sulfide (Na₂S.9H₂O), and 100 cc. of ethyl alcohol was heated, while stirring, to 80° to 85° C. for two hours under a reflux condenser. The mixture was then poured into water and the oil which separated distilled in vacuo. The colorless liquid which distills over at 254° to 257° C./4 mm. is di(phenoxy ethoxyethyl) sulfide having the formula

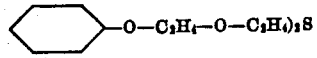

It solidifies to a colorless, crystalline mass. After recrystallization from methanol it has a melting point of 44° C.

Example 2.—A mixture of 82.6 g. of β(β-naphthoxy)-β'-chlorodiethyl ether, 80 g. of sodium sulfide (Na₂S.9H₂O), and 100 g. of ethyl alcohol is boiled under a reflux condenser for eight hours and filtered hot. On cooling the filtrate solidifies to a waxy mass from which the di(β-naphthoxy ethoxyethyl) sulfide having the formula—

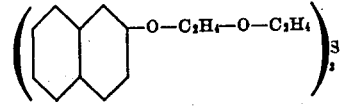

may be obtained by crystallization from alcohol. The crystals are colorless needles melting at 94° C.

Example 3.—A mixture consisting of 38.7 g. of β-(p-cresyloxy-ethoxy)-β'-chlorodiethyl ether, 18 g. of sodium sulfide (Na₂S.9H₂O) and 50 g. of alcohol is boiled under reflux, with agitation, for six hours. The reaction mixture is cooled, filtered, and the filtrate distilled in vacuo. The product, di(cresyloxy ethoxyethoxyethyl) sulfide, having the formula—

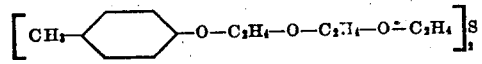

comes over at about 295° to 320° C./5 mm. as a colorless oil. Yield 70% of theory.

Example 4.—A mixture consisting of 47 g. of β(2,4-dichlorophenoxy ethoxy)-β'-chlorodiethyl ether, 18 grams of sodium sulfide crystals, and 50 cc. of alcohol is boiled for six hours under a reflux. The product is separated as in Example 3. It is an oil which distills at 250° to 260° C./5 mm. and has the formula:

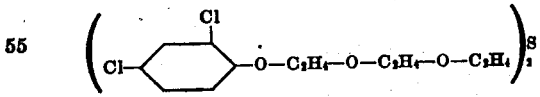

Example 5.—A mixture consisting of 46 g. of β-tetra-hydrofurfuryloxy-β'-chlorodiethyl ether, 24 g. of sodium sulfide crystals, and 50 cc. of alcohol was boiled under reflux for six hours. The filtered reaction mixture was distilled in vacuo. The product comes over about 220° C./7 mm. as a colorless oil. It is di(tetrahydrofurfuryloxy ethoxyethyl) sulfide having the formula—

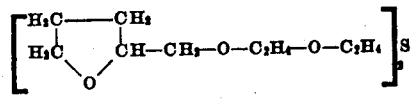

Example 6.—A mixture consisting of 20 g. of flake sodium sulfide (60% purity), 100 g. of alcohol, and 62.6 g. of β-(p-α, α, γ, γ-tetramethyl butylphenoxy)-β'-chlorodiethyl ether was boiled under reflux for eight hours. The reaction product was poured into water, the oily layer taken up in benzene, separated, washed, and distilled in vacuo. The product distills with a little decomposition at about 320° C./3 mm. as a pale yellow oil. It is di(p-α, α, γ, γ-tetramethyl butylphenoxy ethoxyethyl) sulfide having the formula—

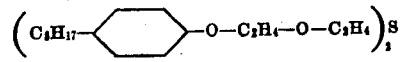

Example 7.—A mixture consisting of 60 g. of sodium sulfide (Na₂S.9H₂O), 100 cc. of alcohol, and 122 g. of β-phenoxyethoxy-β'-chlorodiethyl ether was boiled under reflux for seven hours. It was then filtered and the filtrate distilled in vacuo. The product, di(phenoxyethoxyethoxyethyl) sulfide, having the formula—

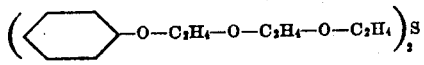

distills over at 300° to 320° C./5 mm. as a pale yellow oil. Yield 90 grams.

Example 8.—A mixture consisting of 42.6 g. of β-p-terbutyl phenoxy-β'-chlorodiisopropyl ether, 18 g. of sodium sulfide (Na₂S.9H₂O), and 50 cc. of alcohol was boiled seven hours under reflux, and the oily product distilled in vacuo. It came over at 300° to 312° C./4 mm. The product, di(p-tertiary butylphenoxy isopropyloxy isopropyl) sulfide, having the formula—

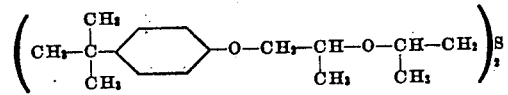

is a pale yellow, viscous oil.

Example 9.—A mixture consisting of 30 g. of sodium sulfide (Na₂S.9H₂O), 70.6 g. of β-p-cyclohexylphenoxy-β'-chlorodiethyl ether, and 50 cc. of alcohol is boiled under reflux for four hours and filtered hot. The reaction product, di(p-cyclohexylphenoxy ethoxyethyl) sulfide, having the formula—

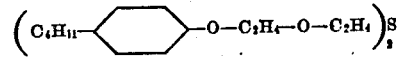

crystallizes out on cooling. It can be recrystallized from alcohol, and forms colorless crystals melting at 66° C.

Example 10.—A mixture consisting of 67 g. of β-p-benzylphenoxy-β'-chlorodiethyl ether, 24 g. of sodium sulfide (Na₂S.9H₂O), and 50 g. of alcohol is boiled for seven hours under reflux, and worked up as in Example 7. The product is an oil which boils above 360° C./1 mm. It is di(p-benzylphenoxy ethoxyethyl) sulfide having the formula (p—C₆H₅—CH₂—C₆H₄—O—C₂H₄—O—C₂H₄)₂S Example 11.—A mixture consisting of 64 g. of β-p-phenylphenoxy-β'-chlorodiethyl ether, 24 g. of sodium sulfide (Na₂S.9H₂O), and 50 cc. of alcohol is boiled five hours under reflux. The oil obtained crystallizes on cooling to colorless crystals which, upon crystallization from alcohol, melt at 68° C. The product, di(p-phenyl-phenoxy ethoxyethyl) sulfide has the formula

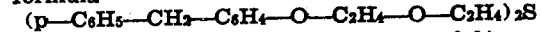

Example 12.—A mixture of 55 g. of thiophenol, 286 g. of β, β'-dichlorodiethyl ether, 23.4 g. of sodium hydroxide, and 25 cc. of water was heated at 110° to 115° C. under reflux, with stirring, for six hours. The water was then distilled off, the sodium chloride removed by filtration, and the filtrate fractionated in vacuo. The phenyl-thioethoxyethyl chloride having the formula

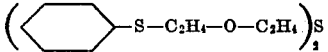

was obtained as a colorless oil boiling at 141° to 157° C./4 mm., yield 96%.

A mixture of 21.6 grams of the phenyl-thioethoxyethyl chloride, 12 g. of sodium sulfide (Na₂S.9H₂O), and 25 cc. of alcohol was boiled under reflux six hours. The oil formed was separated, washed with water, and distilled in vacuo.

The di(phenyl-thioethoxyethyl) sulfide having the formula—

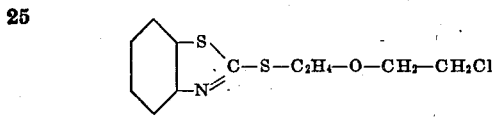

came over at 275° to 283° C./4 mm. as an oil.

*Example 13.*—A mixture consisting of 1 mol. equivalent mercaptobenzothiazole, 1.2 mols of sodium hydroxide in an equal weight of water, and 3 mols of β, β'-dichlorodiethyl ether was heated at 115° C. for eight hours under reflux, with constant stirring. The product obtained, namely: benzothiazyl-thioethoxy-ethyl chloride, having the formula

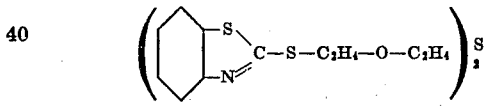

formed a yellow oil boiling at 195° to 200° C./3 mm.

A mixture of 27.3 g. of the benzothiazyl-thioethoxyethyl chloride, 12 g. of sodium sulfide (Na₂S.7H₂O), and 25 g. of alcohol was boiled under reflux for five hours, with stirring. The oil, upon fractionation in vacuo, yielded the desired product as a yellow oil, boiling at 290° to 300° C./4 mm. It is di(benzothiazyl-thioethoxyethyl) sulfide having the formula—

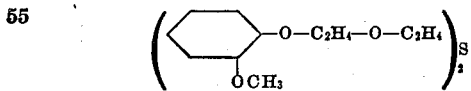

*Example 14.*—A mixture consisting of 27.4 g. of β - o - methoxyphenoxy - β' - chlorodiethyl ether (made from guaiacol, sodium hydroxide, and β, β'-dichlorodiethyl ether), 12 g. of sodium hydroxide (Na₂S.9H₂O), and 50 cc. of alcohol was boiled five hours under reflux, with stirring. The filtrate from the reaction product was fractionated in vacuo. The desired product distilled at about 300° to 320° C./4 mm., as a light yellow oil. It is di(o-methoxyphenoxy ethoxyethyl) sulfide having the formula—

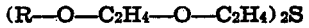

Yield—78%.

In the above examples the sodium sulfide can be replaced by a molecularly equivalent of potassium sulfide or other water-soluble inorganic sulfide.

I claim:

1. Di(phenoxy ethoxyethyl) sulfide having the formula (C₆H₅—O—C₂H₄—O—C₂H₄)₂S.

2. A compound having the general formula (R—O—C₂H₄—O—C₂H₄)₂S in which R is an aromatic hydrocarbon radical attached to the oxygen atom by means of a nuclear carbon atom.

3. A compound having the general formula (R—O—C₂H₄—O—C₂H₄)₂S in which R is an aromatic radical attached to the oxygen atom by means of a nuclear carbon atom.

4. A compound having the general formula (R—A—C₂H₄—O—C₂H₄)₂S in which R is an aromatic radical and A is a member of the group consisting of oxygen and sulfur, the radical represented by R being attached to the atom represented by A by means of a nuclear carbon atom.

5. A compound having the general formula (R—A—(CₙH₂ₙ—O)ₓ—CₙH₂ₙ)₂S in which R is an organic cyclic group selected from the group consisting of aromatic, alicyclic and heterocyclic radicals, A is a member of the group consisting of oxygen and sulfur, x is one to two and n is two to three, the radical represented by R being attached to the atom represented by A by means of a nuclear carbon atom.

6. The process of preparing di(phenoxy ethoxyethyl) sulfide which comprises heating a mixture of sodium sulfide and β-phenoxy-β'-chlorodiethyl ether in an inert solvent.

7. The process of preparing compounds of the general formula (R—O—C₂H₄—O—C₂H₄)₂S in which R is an aromatic radical attached to the oxygen atom by means of a nuclear carbon atom which comprises heating an alkali metal sulfide and an ether chloride having the general formula R—O—C₂H₄—O—C₂H₄Cl in an inert solvent.

8. The process of preparing compounds of the general formula (R—A—C₂H₄—O—C₂H₄)₂S in which R is an aromatic radical and A is a member of the group consisting of oxygen and sulfur, the radical represented by R being attached to the atom represented by A by means of a nuclear carbon atom, which comprises heating an ether chloride of the general formula R—A—C₂H₄—O—C₂H₄Cl with an alkali metal sulfide in an inert solvent.

9. The process of preparing compounds of the general formula (R—A—(CₙH₂ₙ—O)ₓ—CₙH₂ₙ)₂S in which R is an organic cyclic group selected from the group consisting of aromatic, alicyclic and heterocyclic radicals, A is a member of the group consisting of oxygen and sulfur, the radical represented by R being attached to the atom represented by A by means of a nuclear carbon atom, x is one to two and n is two to three which consists in heating an ether halide of the general formula R—A—(CₙH₂ₙ—O)ₓ—CₙH₂ₙY in which Y is a halogen with an alkali metal sulfide.

10. Di-(β-naphthoxyethoxyethyl) sulfide having the formula—

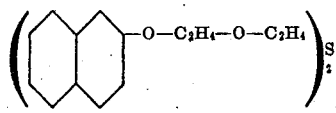

11. Di- (p-phenylphenoxyethoxyethyl) sulfide, having the formula—

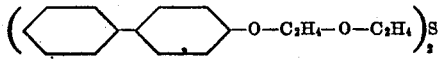

HERMAN A. BRUSON.